(12) United States Patent
Reddy et al.

(10) Patent No.: US 11,181,798 B2
(45) Date of Patent: Nov. 23, 2021

(54) ELECTROCHROMIC DEVICE WITH COLOR CORRECTION

(71) Applicant: Gentex Corporation, Zeeland, MI (US)

(72) Inventors: Damoder Reddy, Santa Clara, CA (US); Brian Gergen, Santa Clara, CA (US)

(73) Assignee: GENTEX CORPORATION, Zeeland, MI (US)

( * ) Notice: Subject to any disclaimer, the term of this patent is extended or adjusted under 35 U.S.C. 154(b) by 0 days.

(21) Appl. No.: 17/070,310

(22) Filed: Oct. 14, 2020

(65) Prior Publication Data

US 2021/0109418 A1 Apr. 15, 2021

Related U.S. Application Data

(60) Provisional application No. 62/915,389, filed on Oct. 15, 2019.

(51) Int. Cl.
*G02F 1/163* (2006.01)
*G02F 1/1514* (2019.01)

(52) U.S. Cl.
CPC ............ *G02F 1/163* (2013.01); *G02F 1/1514* (2019.01); *G02F 2001/15145* (2019.01)

(58) Field of Classification Search
CPC .................. G02F 1/163; G02F 1/1514; G02F 2001/15145; G02F 2001/164; G02F 2201/086; G02F 2202/022; G02F 1/15; G02F 2001/1502; G02F 2001/15025; G02F 2001/44
See application file for complete search history.

(56) References Cited

U.S. PATENT DOCUMENTS

2010/0172009 A1\* 7/2010 Matthews ............... G02F 1/163
359/265
2010/0172010 A1 7/2010 Gustavsson et al.

FOREIGN PATENT DOCUMENTS

| KR | 20150009866 | 1/2015 |
| KR | 20180035344 | 4/2018 |
| WO | WO-2013/158365 | 10/2013 |

OTHER PUBLICATIONS

International Search Report and Written Opinion issued for PCT/US2020/055535, dated Jan. 29, 2021, 21 pages.

\* cited by examiner

*Primary Examiner* — Joseph P Martinez
(74) *Attorney, Agent, or Firm* — Foley & Lardner LLP; Brian James Brewer

(57) ABSTRACT

A system and method for color correction in an electrochromic device includes applying a stepped voltage profile to the electrochromic device in a high-transmission state to achieve a desired low-transmission state. Each step of the stepped voltage profile is at a step difference of about 0.01 volts to about 0.5 volts from an adjacent step with each successive step being at a varying voltage level and each of the steps is held for a time period from about 0.1 seconds to about 10 seconds. At the desired low-transmission state, the system and method include applying a reverse bias voltage from about 0.01 volts to about 0.5 volts for about 0.01 seconds to about 10 seconds to color correct the low-transmission state.

20 Claims, 5 Drawing Sheets

ELECTROCHROMIC DEVICE WITH COLOR CORRECTION

CROSS-REFERENCE TO RELATED APPLICATIONS

This application claims the benefit of and priority to U.S. Provisional Patent Application No. 62/915,389, filed on Oct. 15, 2019, the contents of which are incorporated herein by reference in their entirety.

FIELD

The present disclosure generally relates to an electrochromic device, and more particularly, relates to an electrochromic device configured for color correction.

SUMMARY

In accordance with some aspects of the present disclosure, a method for color correction in an electrochromic device is disclosed. The method includes applying a stepped voltage profile to the electrochromic device in a high-transmission state to achieve a desired low-transmission state. Each step of the stepped voltage profile is at a step difference of about 0.01 volts to about 0.5 volts from an adjacent step with each successive step being at a varying voltage level and each step is held for a time period from about 0.1 seconds to about 10 seconds. At the desired low-transmission state, the method includes applying a reverse bias voltage from about 0.01 volts to about 0.5 volts for about 0.01 seconds to about 10 seconds to color correct the low-transmission state.

In accordance with some other aspects of the present disclosure, a method for maintaining a low-transmission state of an electrochromic device is disclosed. The method includes applying a stepped voltage profile to the electrochromic device in the low-transmission state to maintain the low-transmission state within 5% transmission. Each step is at a step difference of about 0.01 volts to about 0.5 volts from an adjacent step, with each successive step being at a varying voltage level, and each step being held for a time period from about 0.1 seconds to about 10 seconds. At the low-transmission state, the method includes applying a reverse bias voltage from about 0.01 volts to about 0.1 volts for about 0.1 seconds to about 10 seconds to color correct the low-transmission state.

In accordance with more aspects of the present disclosure, a method of applying a voltage to an electrochromic device at elevated temperature is disclosed. The method includes applying a stepped voltage profile to the electrochromic device at the elevated temperature to achieve a desired low-transmission state. Each step in the stepped voltage profile is at a step difference of about 0.01 volts to about 0.5 volts from an adjacent step, with each successive step being at a varying voltage level, and being held for a time period from about 0.1 seconds to about 5 seconds. At the desired low-transmission state, the method includes applying a reverse bias voltage from about 0.01 volts to about 0.5 volts for about 0.01 seconds to about 10 seconds. The elevated temperature is a temperature above ambient temperature.

In accordance with some other aspects of the present disclosure, an electrochromic device is disclosed. The electrochromic device includes a first electrode, a second electrode, a cathodic material adjacent the first electrode and having a polythiophene-based compound, an anodic material adjacent the second electrode and comprising an ion storage layer, and an electrolyte between the cathodic material and the anodic material. The electrochromic device also includes a controller configured to apply a negative voltage to induce reduction of the cathodic material and oxidation of the anodic material to obtain a low-transmission state of the electrochromic device, apply a positive voltage to perform color correction in the electrochromic device at the low-transmission state, and apply another negative voltage to reduce transmission of the electrochromic device to a lower transmission state.

In accordance with yet other aspects of the present disclosure, a non-transitory computer readable media including computer-readable instructions is disclosed. The computer-readable instructions when executed by a controller associated with an electrochromic device cause the controller to apply a stepped voltage profile to the electrochromic device in a high-transmission state to achieve a desired low-transmission state. Each step of the stepped voltage profile is at a step difference of about 0.01 volts to about 0.5 volts from an adjacent step with each successive step being at a varying voltage level and each step is held for a time period from about 0.1 seconds to about 10 seconds. The computer-readable instructions also cause the controller to, at the desired low-transmission state, apply a reverse bias voltage from about 0.01 volts to about 0.5 volts for about 0.01 seconds to about 10 seconds to color correct the low-transmission state.

The foregoing summary is illustrative only and is not intended to be in any way limiting. In addition to the illustrative aspects, embodiments, and features described above, further aspects, embodiments, and features will become apparent by reference to the following drawings and the detailed description.

Figure 1:
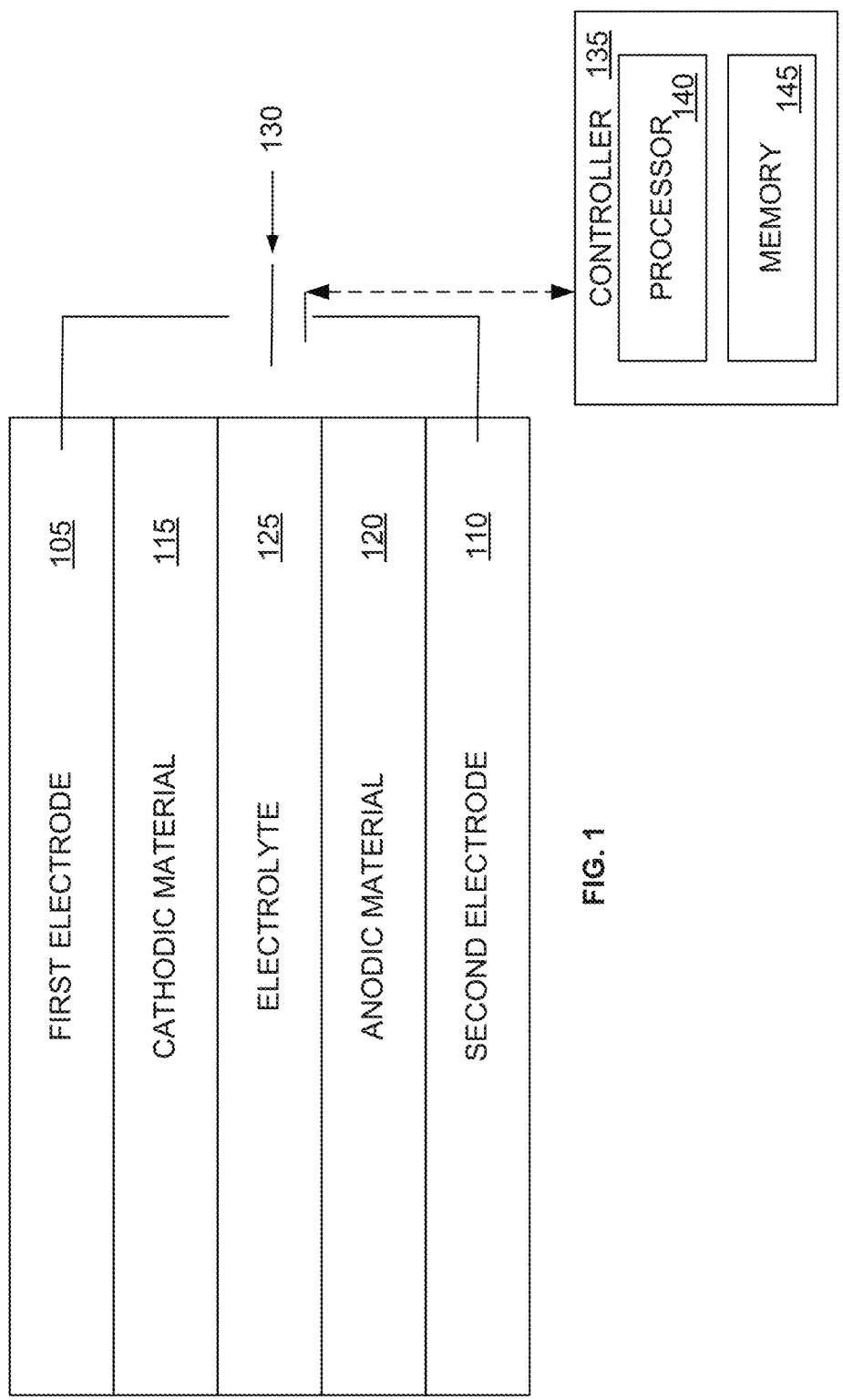
FIG. 1 is an example of an electrochromic device, in accordance with some embodiments of the present disclosure.

The foregoing and other features of the present disclosure will become apparent from the following description and appended claims, taken in conjunction with the accompanying drawings. Understanding that these drawings depict only several embodiments in accordance with the disclosure and are therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

Electrochromic materials are a subset of the family of chromogenic materials, which also includes photochromic materials and thermochromic materials. Electrochromic materials change their color or opacity when exposed to electricity. Electrochromic materials have attracted widespread interest in applications relating to the transmission of light, and they have found use in mirrors, windows, sunglasses, prescription eyeglasses, displays, and the like, where color modulation or appearance changes are desired by changing the transmission of the device to the incident light. For example, high-transmission states are those states where light may pass through the electrochromic device with low absorption or changes, while low-transmission states are where the light is absorbed to a greater extent than in the high-transmission state. However, in some cases, as the device approaches a low-transmission state during use, undesirable coloration may occur. Described herein are methods for minimizing or eliminating such undesirable coloration.

Additionally, when operating an electrochromic device, typically, to reach a low-transmission state, a voltage may be applied to the device, and to reach the high-transmission state from a lower transmission state, the reverse voltage may be applied. Once a desired low-transmission state is achieved, it has now been found that it may be maintained by application of a voltage pulsing sequence.

Finally, the repeated cycling of electrochromic devices at elevated temperature, can impact the stability of the device over time. It has now been found that the application of a specified pulsing sequence can minimize the damage to the device during cycling at elevated temperatures.

Referring now to FIG. 1, an schematic illustration of an electrochromic device 100 is shown, in accordance with some embodiments of the present disclosure. The electrochromic device 100 may be used in a wide variety of applications. For example, in some embodiments, the electrochromic device 100 may be configured for use as an electrochromic window, such as in aircrafts and other vehicles, or for architectural buildings. In other embodiments, the electrochromic device 100 may be used in displays and screens for watches, calculators, computers, eye wear, sun visors, information display boards, digital billboards, and the like. Generally speaking, the electrochromic device 100 may be used in any suitable application that desires controlling the amount of light that comes through or is reflected.

The electrochromic device 100 includes a first electrode 105 and a second electrode 110 spaced apart from the first electrode. Although not shown, a seal or sealing member may be disposed around the periphery of the first electrode 105 and the second electrode 110 to define an enclosed chamber between the first electrode and the second electrode. The first electrode 105 may be formed as a first transparent conductive material (also referred to herein as a first conductive material) disposed on a surface of a substrate facing the second electrode 110. Similarly, the second electrode 110 may be formed as a second transparent conductive material (also referred to herein as a second conductive material) disposed on a surface of another substrate facing the first electrode 105.

The substrates on which the first electrode 105 and the second electrode 110 are disposed may be fabricated from a variety of materials, many of which are transparent or substantially transparent in the visible and near infra-red regions of the electromagnetic spectrum, such as, for example, borosilicate glass, soda lime glass, natural and synthetic polymeric resins, plastics, metals, ceramics, and/or composites including polyesters (e.g. PET), polyimides (PI), polycarbonates, polysulfones, polyethylene naphthalate (PEN), ethylene vinyl acetate (EVA), acrylate polymers, as well as cyclic olefin copolymers like Topas®. While particular substrate materials have been disclosed, it is to be understood that numerous other substrate materials may be used in other embodiments, so long as the substrate is at least substantially transparent and exhibit appropriate physical properties, such as strength, to be able to operate effectively in conditions of intended use. In some embodiments, the electrochromic device 100 may be exposed to extreme temperature variation as well as substantial ultra-violet radiation, emanating primarily from the sun. Thus, the substrate materials on which the first electrode 105 and/or the second electrode 110 are disposed may be chosen to withstand the stresses associated with such operating conditions. Further, in some embodiments, the substrates may include a ultra-violet absorbing layer and/or contain a ultra-violet absorbing material for protection from ultra-violet damage. Similarly, in some embodiments, the substrates may include one or more coating(s) to prevent damage, withstand operating stresses, and otherwise increase the effectiveness of the electrochromic device 100.

Additionally, in some embodiments, the substrate on which the first electrode 105 is formed and the substrate on which the second electrode 110 is formed may both be fabricated from the same material, while in other embodiments, different materials may be used for each of the substrates. Further, the thickness of the material used for the substrates may vary from one embodiment to another. In some embodiments, the same thickness of the material may be used for both the substrates. In other embodiments, the material used for the substrate of the first electrode 105 may be of a different thickness than the material used for the substrate of the second electrode 110. In some embodiments, the substrates for the first electrode 105 and/or the second electrode 110 may be fabricated from a material having a thickness ranging from about 0.10 millimeters (mm) to about 12.7 mm depending upon the particular application of the electrochromic device 100.

Further, in some embodiments, the substrates may be tempered, heat strengthened, chemically strengthened, and/or laminated prior to or subsequent to being coated with the first and second conductive material to form the first electrode 105 and the second electrode 110, respectively. Additionally, in some embodiments, if the electrochromic device 100 is a mirror or the electrochromic device includes a mirrored surface, depending upon the surface that incorporates the mirror, the substrate of the first electrode 105 or the second electrode 110 may or may not be transparent. Moreover, the spacing between the substrate of the first electrode 105 and the substrate of the second electrode 110 may vary from one embodiment to another depending upon the application of the electrochromic device 100.

The first conductive material for forming the first electrode 105 and the second conductive material for forming the second electrode 110 may be selected from various suitable electrically conductive materials, such that at least one of the first conductive material or the second conductive material is transparent or substantially transparent. For example, in some embodiments, one or more layers of the first transparent conductive material and/or the second transparent conductive material may be fabricated from fluorine doped tin oxide (FTO), TEC glass, indium/tin oxide (ITO), doped zinc oxide, nickel oxide, indium zinc oxide (IZO), metal oxide/metal/metal oxide (wherein metal oxide can be substituted with metal carbide, metal nitride, metal sulfide, etc.), wire metal grid, or other substantially transparent and highly electrically conductive materials. Generally speaking, any material may be used for the first and/or second transparent conductive materials that: (a) is substantially transparent in the visible, near infra-red, and/or infra-red regions of the electromagnetic spectrum; (b) bonds reasonably well to the substrate on which the conductive material is disposed; (c) maintains the bond when associated with the sealing member; (d) is generally resistant to corrosion from materials contained within the electrochromic device; and (e) exhibits minimal diffusion or specular reflectance as well as sufficient electrical conductance. In some embodiments, the first conductive material and the second conductive material may be provided in the form of a thin coating or film. The thickness of the first conductive material and the second conductive material may vary from one embodiment to another. Further, the thickness and/or material of the first conductive material may vary from the thickness and/or material of the second conductive material.

In contact with the first electrode 105 is a cathodic material layer 115 and in contact with the second electrode 110 is an anodic material layer 120. In some embodiments, either or both of the cathodic material layer 115 and the anodic material layer 120 are transparent or substantially transparent. In some embodiments, the cathodic material layer 115 includes a polythiophene-based material. In other embodiments, the cathodic material layer 115 may include other polymer based materials or other electroactive materials that may be considered suitable for use as a cathode in the electrochromic device 100. The anodic material layer 120 may include anodically coloring materials in some embodiments. In other embodiments, the anodic material layer 120 may include other electroactive ion storing materials that are suitable for use as an anode in the electrochromic device 100. As used herein, the term "electroactive" means a material or compound that undergoes a modification in its oxidation state upon exposure to a particular electrical potential difference or external voltage.

In some embodiments, the cathodic material layer 115 and/or the anodic material layer 120 are variably transmissive to one or more wavelength bands of light when an external voltage is applied between the first electrode 105 and the second electrode 110. For example, in some embodiments, when an external voltage is applied, the cathodic material layer 115 may undergo reduction and the anodic material layer 120 may undergo oxidation with one or both of the anodic and cathodic materials changing color. Upon application of a verse bias voltage, the reduced and oxidized species return to their normal stage and the color is bleached. Thus, the cathodic material layer 115 and/or the anodic material layer 120 may be reversibly switched between a colored, or substantially colored state, and a colorless, or substantially colorless, state by application of an external and its reverse voltage.

As used herein, a "colored state" or "substantially colored state" are collectively referred to herein as a "colored state" and may be defined as a darkened or dimmed color of the electrochromic device 100 in which the light is at least partially blocked or minimized from passing through one or both of the cathodic or anodic layers. The colored state is a "low-transmission state." A "colorless state" or "substantially colorless state" are collectively referred to herein as a "colorless state" and may be defined as a clear or substantially clear color of the electrochromic device 100 in which light is generally allowed to pass through. The colorless state is a "high-transmission state." A "low-transmission state" may be defined as any transmission state that is lower than a highest transmission state achievable with the electrochromic device 100. The lowest transmission state is the lowest achievable transmission state with the electrochromic device 100. Similarly, a "high-transmission state" may be defined as any transmission state that is higher than the lowest transmission state achievable with the electrochromic device 100. The external voltage that is applied to the electrochromic device 100 to change between the low-transmission and high-transmission states may be applied via busbar(s) (not shown) disposed on the first electrode 105 and the second electrode 110. The high- and low-transmission states are typically relative to one another.

Between the cathodic material layer 115 and the anodic material layer 120 is an electrolyte 125. The electrolyte 125 is in contact with both the cathodic material layer 115 and the anodic material layer 120. The electrolyte 125 may be in the form of a transparent liquid solution, gel, or solid. The electrolyte 125 is ionically conductive and electrically insulating. Examples of materials that may be included in the electrolyte 125 may include, but are not limited to, polymer binder, plasticizer, and ion conductor. Ratios of these three components may be varied to obtain an electrolyte layer for the electrolyte 125, which may vary from predominantly a gel or to predominantly a solid film. In some embodiments, both poly(vinyl chloride) (PVC) based and polymethylmethacrylate (PMMA) based gel electrolytes, as well as acrylic polymers, vinyl acetate based polymers, vinyl alcohol based polymers, lithium based salts, etc. may be used for the electrolyte 125. In some embodiments, a plasticizer of the electrolyte 125 may include propylene carbonate (PC), ethylene carbonate (EC), and other suitable materials. The low viscosity of EC and PC may provide an ionic environment that facilitates high ionic mobility. In some embodiments, the electrolyte 125 may include a polymer binder, plasticizer, and salt. In other embodiments, other suitable materials may be used for the electrolyte 125.

The first electrode 105 and the second electrode 110 may be connected via an external voltage source 130 to form an electrical circuit. The electrical circuit may be switched between an open/short circuit configuration, or a closed circuit configuration. In an open/short circuit configuration, no external voltage is applied across the external voltage source 130. In a closed circuit configuration, an external voltage (whether positive or negative voltage, or forward-bias or reverse-bias voltage) is applied across the external voltage source 130. In some embodiments, a switch or other mechanism may be used to change the open/close/short circuit configuration of the electrical circuit. The switch or other mechanism may be controlled by a controller 135. The controller 135 may apply a voltage of some magnitude across the external voltage source 130 to allow charge flow between a portion of the first electrode 105, a portion of the second electrode 110, and the electrolyte 125. To obtain a low-transmission state, the controller 135 may apply a forward bias voltage across the external voltage source 130. When a forward bias voltage is applied via the external voltage source 130 to form a closed circuit, the first electrode 105 and the second electrode 110 facilitate charge transfer through the electrolyte 125 and alter the optical transmissive properties of the cathodic material layer 115 and the anodic material layer 120 to reversibly change the color of those layers. The magnitude of the forward bias voltage that is applied across the external voltage source 130 may vary from one embodiment to another.

As used herein, a forward bias voltage is the voltage applied to transition a device in a high-transmission state to a lower transmission state, while a reverse bias voltage is the voltage that is applied to transition a device from a lower to a higher transmission stage. In some embodiments, the forward bias may be a negative voltage. In some embodiments, the forward bias may be a positive voltage. The positive or negative voltage is entirely dependent upon the specific material that is used as the cathode and/or anodic materials such that a coloration is formed upon application of the forward bias.

Specifically, when a sufficient external forward bias voltage is applied (and the electrical circuit is closed), the anodic material layer 120 is oxidized and the cathodic material layer 115 is reduced. Because of this applied forward bias voltage, the optical transmissive properties of the cathodic material layer 115 and/or the anodic material layer 120 are altered. The altered optical transmissive properties of the cathodic material layer 115 and/or the anodic material layer 120 provide the low-transmission state. Due to this applied external forward bias voltage, the optical properties of the cathodic material layer 115 and/or the anodic material layer 120 may be reversibly changed and controlled. For example, for a cathodic material layer 115 that is thiophene-based, in some embodiments, the change in the transmission state of the electrochromic device 100 may be driven by the change in the thiophene-based cathodic material layer. Thiophene may be colorless when oxidized and colored when reduced. By applying the forward bias voltage (in the case of thiphenes, a negative voltage), the color of the thiophene-based cathodic material layer 115 may be changed.

Further, in some embodiments, when the low-transmission state of the electrochromic device 100 is attained, the external voltage may be removed and the electrochromic device may hold its low-transmission state for a period of time, or slowly decay back to the high-transmission state. When a sufficient external voltage is not applied or when the electrical circuit is in open circuit, the electron transfer through the electrolyte 125 is slow between the cathodic material layer 115 and the anodic material layer 120. Thus, the cathodic material layer 115 and the anodic material layer 120 gradually transition to a high- or higher-transmission state over a period of time. To expedite the transition to the high- or higher-transmission state, the controller 135 may apply a reverse bias voltage (in some embodiments, a positive voltage, where the forward bias was a negative voltage) across the external voltage source 130. The magnitude of the reverse bias voltage that is applied across the external voltage source 130 may vary from one embodiment to another. In some embodiments, the transmissivity of the cathodic material layer 115 and the anodic material layer 120 in the high or higher transmission state may be greater than 10%, 20%, 30%, 40%, 50%, 60%, 70%, or 80% for light of a specific range of wavelengths. In some embodiments, the transmissivity of the cathodic material layer 115 and the anodic material layer 120 in the low or lower transmission state may be less than 80%, 60%, 50%, 40%, 30%, 20%, 10%, 9%, 8%, 7%, 6%, 5%, 4%, 3%, 2%, 1%, 0.5%, or 0.1% for light of a specific range of wavelengths. In some embodiments, the light of a specific range of wavelengths is near infrared light.

In some embodiments, the external voltage source 130 may be associated with the controller 135 that controls the operation of the external voltage source. For example, in some embodiments, the controller 135 may be configured to instruct the external voltage source 130 to apply a forward bias voltage to transition the cathodic material layer 115 and/or the anodic material layer 120 to a colored state. The controller 135 may also be configured to instruct the external voltage source 130 to apply a reverse bias voltage to transition the cathodic material layer 115 and/or the anodic material layer 120 to a colorless state. As discussed below, the controller 135 may be configured to perform a color correction operation. The controller 135 may include a processor 140 to execute computer-readable instructions stored in a memory 145 of the controller. The controller 135 may be configured as a logic block or circuitry and may be implemented in software, hardware, firmware, or a combination thereof. Similarly, the processor 140 may be implemented in hardware, software, firmware, or a combination thereof. To "execute" an instruction, the processor 140 may perform an operation called for by that instruction. The computer-readable instructions may be written using any of a variety of programming languages, scripting languages, assembly language, etc. To "execute" the instruction, the processor 140 may retrieve the instruction from the memory 145. The memory 145 may be any of a variety of volatile, non-volatile, or hybrid memories that are considered suitable for use with the electrochromic device 100.

When the controller 135 applies a forward bias voltage to the external voltage source 130 to transition the device 100 to a low or lower transmission state (collectively referred to herein as a "low-transmission state"), in some embodiments, undesired coloration may occur. The color of the cathodic material layer 115 and/or the anodic material layer 120 during the low-transmission state may be dependent upon the material of the cathodic material layer and the anodic material layer, respectively. For example, in some embodiments, the cathodic material layer 115 and/or the anodic material layer 120 optimally results in a blue or neutral coloration. However, instead of appearing blue/neutral in the colored state, the cathodic material layer 115 and the anodic material layer 120 may exhibit a purplish color due to an increased red component. Such a purplish hue may be undesirable. To obtain and maintain the blue hue during the low-transmission state of the cathodic material layer 115 and the anodic material layer 120, the controller 135 may perform a color correction operation. The color correction operation may decrease the red coloration, resulting in a coloration that appears more blueish, not purplish, in the colored state.

Figure 2:
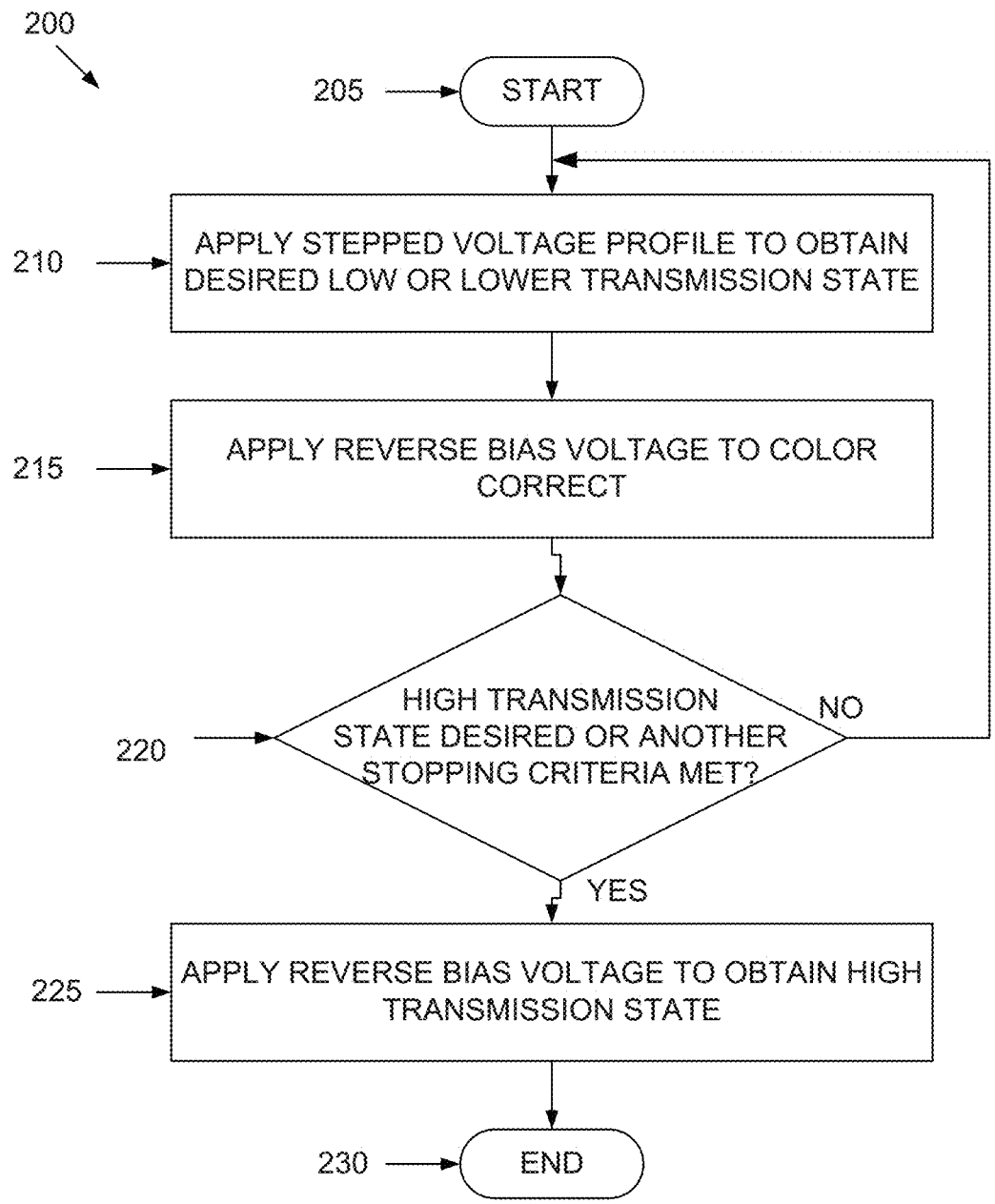
FIG. 2 is an example flowchart outlining operations for performing color correction in the electrochromic device of FIG. 1, in accordance with some embodiments of the present disclosure.

An example operation for performing color correction in the electrochromic device 100 is explained with respect to FIG. 2. Thus, FIG. 2 is an example flowchart outlining operations of a process 200 in accordance with some embodiments of the present disclosure. The process 200 may include other, additional, or different operations depending upon the particular embodiment. The process 200 may be implemented by the controller 135. Upon starting at operation 205 when the electrochromic device 100 is in a colorless or high-transmission state, the controller 135 instructs the external voltage source 130 to apply a stepped voltage profile to transition the cathodic material layer 115 and the anodic material layer 120 to a desired low-transmission state at operation 210. The stepped voltage profile may include a plurality of steps. In some embodiments, the stepped voltage profile may include applying a forward bias voltage. When a forward bias voltage is applied, each of the plurality of steps may be at a step difference of about 0.01 volts to about 0.5 volts from an adjacent step, with each successive step being at a different (e.g., increasing if the forward bias is a positive voltage or decreasing if the forward bias is a negative voltage) voltage level. Further, in some embodiments, each of the plurality of steps may be held for a time period from about 0.1 seconds to about 10 seconds before the voltage level of the next successive step is applied.

The magnitude of the voltage that is applied at each step may vary from one embodiment to another based upon the desired low-transmission state. For example, in some embodiments where the forward bias voltage is a negative voltage, a lower negative voltage may result in a lighter color (e.g., less intensity) of the cathodic material layer 115 and/or the anodic material layer 120, while a higher negative voltage may result in a darker color (e.g., more intensity) of the cathodic material layer and/or the anodic material layer. Similarly, the magnitude of the voltage change in each successive step may vary from one embodiment to another. Additionally, the time period for which the voltage is applied in each step may vary from one embodiment to another. Further, the number of steps in the stepped voltage profile may vary. In some embodiments, the stepped voltage profile may have a single step. In other embodiments, the stepped voltage profile may have multiple steps.

As the stepped voltage profile is applied via the external voltage source 130, a current is generated through the electrochromic device 100. In some embodiments, the controller 135 may be programmed with a specified current value. The controller 135 may be configured to monitor the current flow as the stepped voltage profile is applied. For example, in some embodiments, as the forward bias voltage is applied in each step of the stepped voltage profile, the controller 135 may be configured to monitor the current flowing through the electrochromic device 100. The controller 135 may gradually vary the voltage from a zero voltage in the plurality of steps, as discussed above. For example, when the forward bias voltage is a positive voltage, the controller 135 may gradually increase the voltage from zero volts. When the forward bias voltage is a negative voltage, the controller 135 may gradually decrease the voltage from zero volts. Further, when the current flow through the electrochromic device 100 reaches a predesignated current value, the controller 135 may stop applying the stepped voltage profile. Thus, instead of monitoring the magnitude of the voltage that is applied in each of the plurality of steps, or monitoring the coloration of the cathodic material layer 115 and the anodic material layer 120, the controller 135 may monitor the magnitude of the current flowing through the electrochromic device 100 as a result of the applied voltage.

When the cathodic material layer 115 and the anodic material layer 120 reaches the desired low-transmission state, in some embodiments, the controller 135 may instruct the external voltage source 130 to stop applying the stepped voltage profile and hold the electrochromic device in an open circuit. The magnitude of the voltage in the open circuit is proportional to the magnitude of the voltage of the stepped voltage profile. In the open circuit, the electrochromic device 100 maintains the low-transmission state for a period of time before transitioning back to the high-transmission state gradually. The low-transmission state may be maintained or lowered by applying the stepped voltage profile again.

As the cathodic material layer 115 and/or the anodic material layer 120 transition from the high-transmission state to the low-transmission state at the operation 210, the stepped voltage profile may induce polaron formation within one or both of the electrochromic layers. Due to the polaron formation, the cathodic material layer 115 and/or the anodic material layer 120 may exhibit some undesired coloration. The controller 135 may perform a color correction operation to counteract the undesired coloration. For example, when the electrochromic device 100 appears purplish instead of blueish in the low-transmission state, the controller 135 may perform the color correction operation to reduce the red color component such that the electrochromic device starts appearing blueish instead of purplish. To perform the color correction operation, upon reaching the desired low-transmission state at the operation 210, the controller 135 instructs the external voltage source 130 to apply reverse bias voltage (e.g., positive voltage) to the electrochromic device 100 at operation 215. In some embodiments, the controller 135 may be configured to apply the reverse bias voltage immediately after the low-transmission state of the operation 210 is reached. In other embodiments, the controller 135 may maintain the electrochromic device 100 in an open circuit for a pre-determined period of time after attaining the low-transmission state of the operation 210 and before applying the reverse bias voltage. It is noted that while the "appearance" of the device is described above (i.e. blueish or purplish), such colorations occur at defined voltage values. Accordingly, by monitoring the applied voltage and current of the electrochromic device 100, the "appearance" of the device may be altered as indicated without physical monitoring of the appearance.

In some embodiments, the reverse bias voltage may be applied as a stepped voltage profile, similar to the stepped voltage profile of the operation 210. Thus, the stepped voltage profile may have a single step or a plurality of steps. Each step of the stepped voltage profile may be at a step difference (e.g., at an increment for a positive voltage and at a decrement for a negative voltage) of about 0.01 volts to about 0.5 volts from an adjacent step, and with each successive step being at a varying voltage level (e.g., higher when the reverse bias is a positive voltage and lower when the reverse bias voltage is a negative voltage) than a previous step. Further, in some embodiments, each of the plurality of steps may be held for a time period from about 0.01 seconds to about 10 seconds. In some embodiments, the magnitude of the reverse bias voltage may vary from that described. Similarly, in some embodiments, the time period for which the reverse bias voltage is applied may vary from that described. The reverse bias voltage induces a polaron reduction or cancellation (e.g., breakdown or de-formation) in the electrochromic device 100, leading to color correction.

The total time period for which the reverse bias voltage is applied (whether as a single pulse or as a stepped voltage profile) may be a fraction of the total time period for which the stepped voltage profile of the operation 210 is applied. Upon achieving the desired color correction, the electrochromic device 100 may be held in an open circuit. As a result of the electrochromic device 100 being held in open circuit, the cathodic material layer 115 and/or the anodic material layer 120 start transitioning to a higher transmission state. The controller 135 may monitor the transmission state of the cathodic material layer 115 and/or the anodic material layer 120, either physically or through current feedback and voltage monitoring. In some embodiments, the controller 135 may monitor the transmission state by way of monitoring the current flow through the electrochromic device 100. In some embodiments, when the transmission state of the electrochromic device 100 increases by about 5% (e.g., the electrochromic device 100 becomes less colored—i.e. a higher transmission state) as a result of being held in open circuit, the controller 135 may apply a forward bias voltage to again reduce the transmission state again. In some embodiments, the controller 135 may instruct the external voltage source 130 to apply the forward bias voltage as another stepped voltage profile similar to the stepped voltage profile of the operation 210. Each step of stepped voltage profile may be about 0.01 volts to about 0.5 volts, and for a time period from about 0.1 seconds to about 10 seconds. In other embodiments, the characteristics (e.g., the voltage magnitude and time period) of the stepped voltage profile may vary from those described. By applying the stepped voltage profile, the controller 135 may attempt to maintain the low-transmission state or prevent the low-transmission state from increasing by more than about 5%. In other embodiments, other percentage values may be programmed within the controller 135.

Further, in some embodiments, the number of steps in each stepped voltage profile (whether at the operation 210 or 215) may be the same, while in other embodiments, the number of steps in one stepped voltage profile may vary from the number of steps in another stepped voltage profile. Additionally and generally speaking, in the forward bias voltage or reverse bias voltage application, the voltage may gradually vary from an initial voltage value to a pre-determined final voltage. In some embodiments, the initial voltage value may be zero volts. In other embodiments, the initial voltage value may be greater than zero volts. In some embodiments, the pre-determined final voltage may correspond to the pre-designated current value discussed above. In some embodiments, the controller 135 may monitor the current flow through the electrochromic device 100 as the voltage is gradually varied. Once the current value reaches the pre-designated current value, the controller 135 may instruct the external voltage source 130 to stop applying the external voltage to the electrochromic device 100.

Further, the magnitude of the pre-designated current value that is used by the controller 135 at the operations 210 and 215 may be based at least in part on the size and shape of the electrochromic device 100. For example, in some embodiments, for a twelve inch by twelve inch configuration of the electrochromic device 100, a minimum current value may be zero amperes and a maximum current value may be about thirty-one hundred and fifty milliamperes, and the voltage increment/decrement in each step of a stepped voltage profile may be +/−one volts.

In some embodiments, when the electrochromic device 100 is in a high-transmission state or a low-transmission state, and the external voltage application is removed such that the electrochromic device is held in an open circuit state, the open circuit voltage of the electrochromic device may be slightly below the voltage that was applied before the external voltage was removed. For example, if the applied voltage in a high-transmission state is one volts, when the external voltage is removed, the open circuit voltage of the electrochromic device 100 may be measured at a 0.7 volts instead of the one volts that was applied in the high-transmission state. The controller 135 may measure the open circuit voltage and the current flowing the electrochromic device 100 and then apply an external voltage (either in a forward bias or reverse bias) when the open circuit voltage decreases below a pre-defined threshold. Thus, the controller 135 may use feedback from the measured open circuit voltage and the current flowing through the electrochromic device 100 to control application of the external voltage.

Thus, at the operation 215, the controller 135 applies a reverse bias voltage, holds the electrochromic device 100 in open circuit for a time period, before applying a forward bias voltage to maintain the low-transmission state. From the low-transmission state, the controller 135 may again apply a reverse bias voltage and hold the electrochromic device 100 before applying another forward bias voltage. The above cycle is repeated until a high-transmission state is desired or until another stopping criterion is reached. The stopping criterion may include a number of cycles being run, the cycles being run for a pre-determined period of time, etc. Thus, at operation 220, the controller 135 monitors for an input indicative of achieving a high-transmission state or for satisfaction of a stopping criterion. If the controller 135 determines that the electrochromic device 100 is to transition to a high-transmission state or that a stopping criterion has been satisfied, the controller instructs the external voltage source 130 to apply a reverse bias voltage to the electrochromic device 100 at operation 225 to expedite achieving the high-transmission state. In some embodiments, the controller 135 may simply leave the electrochromic device 100 in an open/short circuit to transition the electrochromic device gradually to the high-transmission state. When the high-transmission state is attained, the process 200 ends at an operation 230. On the other hand, if at the operation 220, the controller 135 determines that the high-transmission state is not desired and no stopping criterion has been met, the controller continues applying the reverse bias and forward bias cycles, as discussed above.

In some embodiments, instead of using a stepped voltage profile with discreet values as described herein, in some embodiments, the voltage values in the forward bias and the reverse bias may be changed in a gradual ramp up/down, for example, at a rate of about fifty mV/sec. In some embodiments, the voltage ramp rate may be changed until a specific voltage level is reached. When the specific voltage level is reached, the voltage ramp rate may be changed to a different ramp rate until another voltage level is reached. For example, in some embodiments, a ramp rate of 0.01V/sec from 0V to 0.05V, a ramp rate of 0.05V/sec ramp from 0.05V to 0.2V, a ramp rate of 0.1V/sec from 0.2V to 1.0V, and so on may be used. In other embodiments, other ramp rates may be used.

Although the present disclosure has been described, in some embodiment, as the forward bias voltage being a negative voltage and the reverse bias voltage being a positive voltage such that the negative voltage is applied to obtain the low-transmission state, and the positive voltage is applied for color correction, in other embodiments, the forward bias voltage may be a positive voltage and the reverse bias voltage may be a negative voltage. In such cases, the low-transmission state may be obtained by applying a positive voltage and the color correction may be performed by applying a negative voltage. Generally speaking, the polarity of the voltage that is applied for color correction is opposite the polarity of the voltage that is applied to obtain a low-transmission state.

Figure 3:
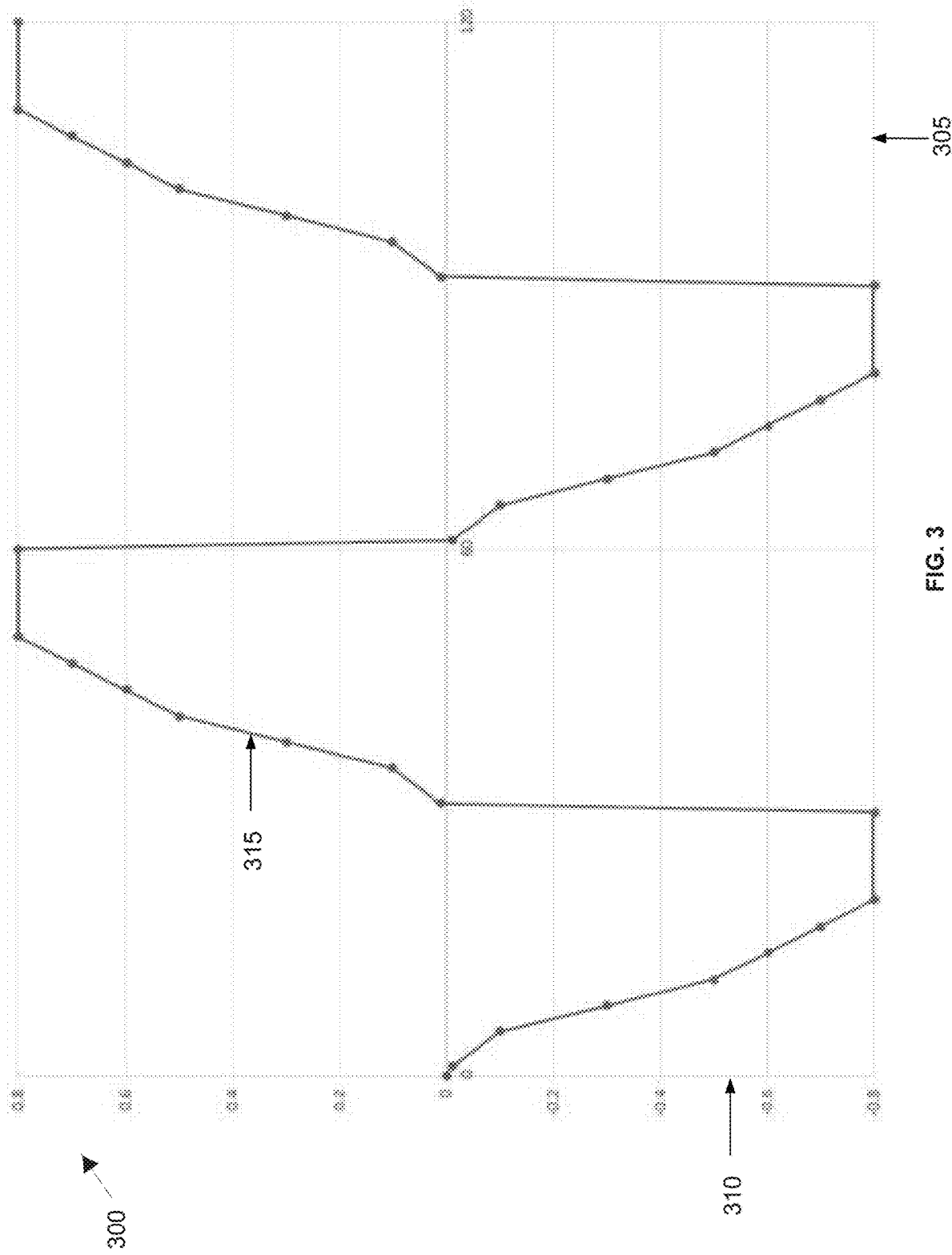
FIG. 3 is an example graphical representation showing a stepping voltage profile for performing the color correction in the electrochromic device of FIG. 1, in accordance with some embodiments of the present disclosure.

Referring now to FIG. 3, an illustrative graph 300 for a stepped voltage profile is shown, in accordance with some embodiments of the present disclosure. The graph 300 plots time on X-axis 305 against voltage on Y-axis 310 at or about room temperature (e.g., between about 20° Celsius to about 25° Celsius). The graph 300 plots the following example of a stepped voltage profile:

TABLE 1

| Time (sec) | Voltage |
| --- | --- |
| 0 | 0 |
| 1 | −0.01 |
| 5 | −0.1 |
| 8 | −0.3 |
| 11 | −0.5 |
| 14 | −0.6 |
| 17 | −0.7 |
| 20 | −0.8 |
| 30 | −0.8 |
| 31 | 0.01 |
| 35 | 0.1 |
| 38 | 0.3 |
| 41 | 0.5 |
| 44 | 0.6 |
| 47 | 0.7 |
| 50 | 0.8 |
| 60 | 0.8 |
| 61 | −0.01 |
| 65 | −0.1 |
| 68 | −0.3 |
| 71 | −0.5 |
| 74 | −0.6 |
| 77 | −0.7 |
| 80 | −0.8 |
| 90 | −0.8 |
| 91 | 0.01 |
| 95 | 0.1 |
| 98 | 0.3 |
| 101 | 0.5 |
| 104 | 0.6 |
| 107 | 0.7 |
| 110 | 0.8 |
| 120 | 0.8 |

It is to be understood that the values in Table 1 are only an example and not intended to be limiting in any way.

As seen from Table 1 above, the controller 135 applies the operations 210 and 215 as stepped voltage profiles. The negative voltages in Table 1 above correspond to a forward bias voltage and the positive voltages correspond to a reverse bias voltage. Further, each row of Table 1 may be considered one step of a stepped voltage profile. During each step, either a negative voltage (in this embodiment a forward bias) or a positive voltage (in this embodiment a reverse bias) is applied for a period of time. For example, as seen from Table 1 above, the voltage in each step is applied for about three seconds before the voltage of the next step is applied. In other embodiments, the duration of time for which a voltage in applied in a particular step may be greater than or less than about three seconds. Further, the duration of time for which a voltage is applied in one step may be different from the duration of time for which the voltage is applied in another step.

Further, in some embodiments, when a negative voltage is transitioned to a positive voltage, a spike in current may be observed through the electrochromic device 100. The spike in the current may be undesirable due to its adverse impact on the electrochromic device 100. To minimize the impact of the current spike, in some embodiments, when the negative voltage is transitioned to a positive voltage, the first step of the positive voltage may be a very small increase. The very small increase in voltage may correspond to a current value, which if drawn across the electrochromic device 100 may not adversely impact the electrochromic device. For example, as shown in Table 1 above, when the voltage is transitioned between thirty and thirty one seconds, the positive voltage that is applied in the first step is only 0.01 volts, which is much lower than the voltages (e.g., 0.1, 0.3, 0.5, etc.) that are applied in each of the remaining steps.

The stepping voltage profile of Table 1 above is also shown in the graph 300. Thus, the graph 300 shows a plot 315 that plots each step (e.g., each row) of Table 1 above. From the plot 315, it is seen that when the negative voltage is applied, the voltage gradually reduces until a voltage corresponding to a pre-designated current value is attained to obtain a low-transmission state. Thereafter, the electrochromic device 100 is held in open circuit for a short period of time before applying positive voltage for color correction, leading to an increase in the voltage.

With regard to the current values, it is noted that the peak current for the device varies with applied voltage, and the geometry of the device. For example, a 12"×12" device may have a peak current as high as 120-500 mA with a standard +/−1V profile. With the stepped profile, peak current may be reduced to 30 mA in such a device. By adjusting the stepped profile, peak current can be adjusted between 30 mA and 150 mA.

Figure 4:
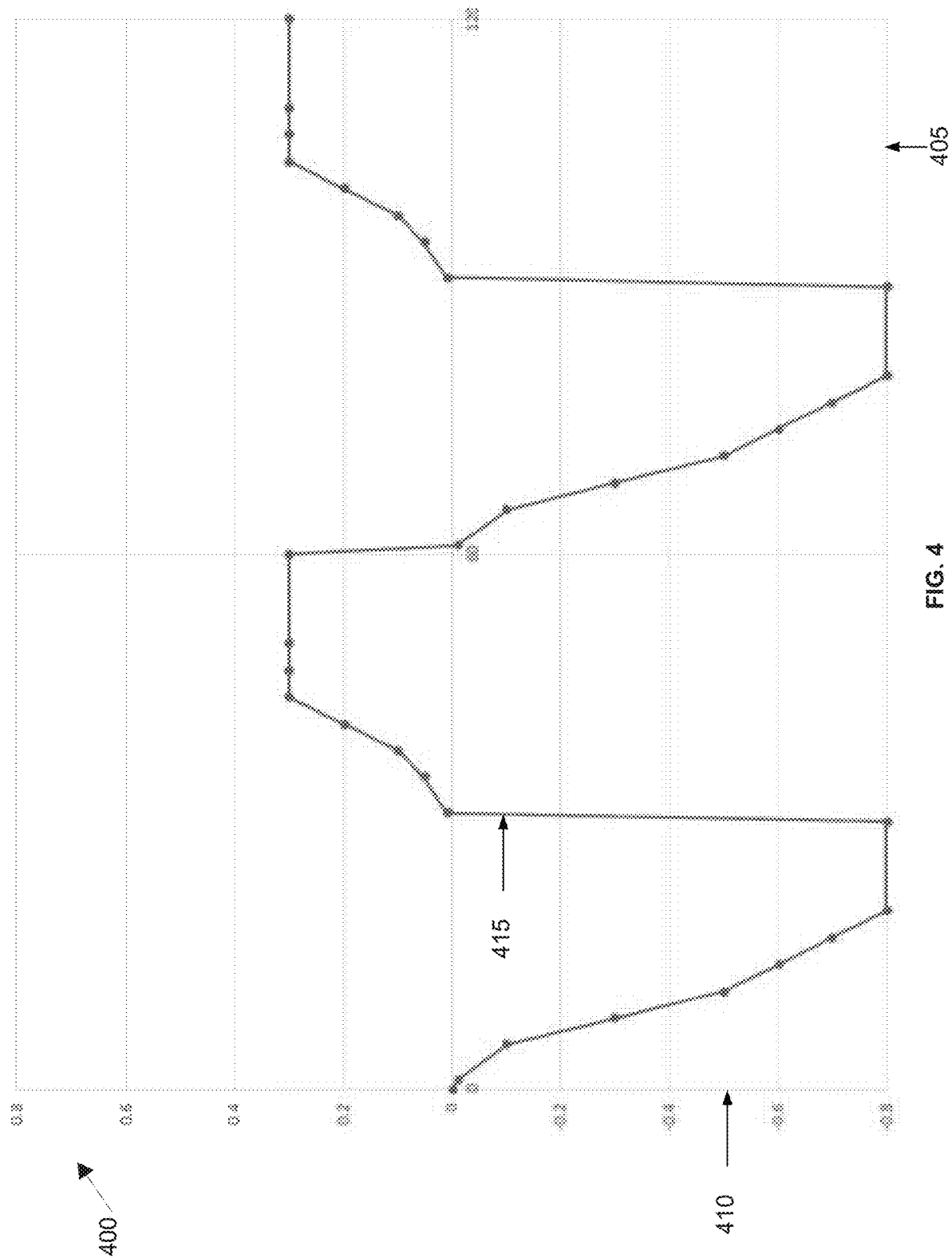
FIG. 4 is another graphical representation showing a stepping voltage profile for performing the color correction in the electrochromic device of FIG. 1 at elevated temperatures, in accordance with some embodiments of the present disclosure.

Turning now to FIG. 4, another example graph 400 is shown, in accordance with some embodiments of the present disclosure. The graph 400 is similar to the graph 300 in that the graph 400 also plots time on X-axis 405 against voltage on Y-axis 410. The graph 400 plots shows how the stepped voltage profile may be modified at an elevated temperature (e.g., about 70° Celsius). At increased temperatures (e.g., at or above about 50° Celsius), the stability of the electrochromic device 100 may decrease. The decreased stability of the electrochromic device 100 at higher temperatures may also impact the stability of the electrochromic device during the operation 215 during which the forward and reverse bias voltages are applied. For example, if a number of forward bias/reverse bias cycles at below 70° Celsius with a +/−1 volt steps is greater than 5,000 cycles, at above 70° Celsius, the number of cycles may be reduced to less than 5000 cycles. To reduce the impact of the elevated temperatures, in some embodiments, the magnitude of the voltages in the reverse bias (e.g., positive voltage) may be reduced. By reducing the magnitude of the positive voltage, a number of forward bias/reverse bias cycles at above 70° Celsius may be greater than 50,000. The magnitude of the voltages in the forward bias (e.g., negative voltage) may remain the same as during room temperature. For example, in some embodiments, the graph 400 may plot the following stepping voltage profile:

TABLE 2

| Time (sec) | Voltage |
| --- | --- |
| 0 | 0 |
| 1 | −0.01 |
| 5 | −0.1 |
| 8 | −0.3 |
| 11 | −0.5 |
| 14 | −0.6 |
| 17 | −0.7 |
| 20 | −0.8 |
| 30 | −0.8 |
| 31 | 0.01 |
| 35 | 0.05 |
| 38 | 0.1 |
| 41 | 0.2 |
| 44 | 0.3 |
| 47 | 0.3 |
| 50 | 0.3 |
| 60 | 0.3 |

TABLE 2-continued

| Time (sec) | Voltage |
|---|---|
| 61 | −0.01 |
| 65 | −0.1 |
| 68 | −0.3 |
| 71 | −0.5 |
| 74 | −0.6 |
| 77 | −0.7 |
| 80 | −0.8 |
| 90 | −0.8 |
| 91 | 0.01 |
| 95 | 0.05 |
| 98 | 0.1 |
| 101 | 0.2 |
| 104 | 0.3 |
| 107 | 0.3 |
| 110 | 0.3 |
| 120 | 0.3 |

As seen from Table 2 above, the magnitude of the voltages when the negative voltage is applied is same as the voltages in Table 1. However, the magnitude of positive voltages is lower in Table 2 compared to that in Table 1. The graph 400 shows a plot 415 that plots the various steps of Table 2 above.

Figure 5:
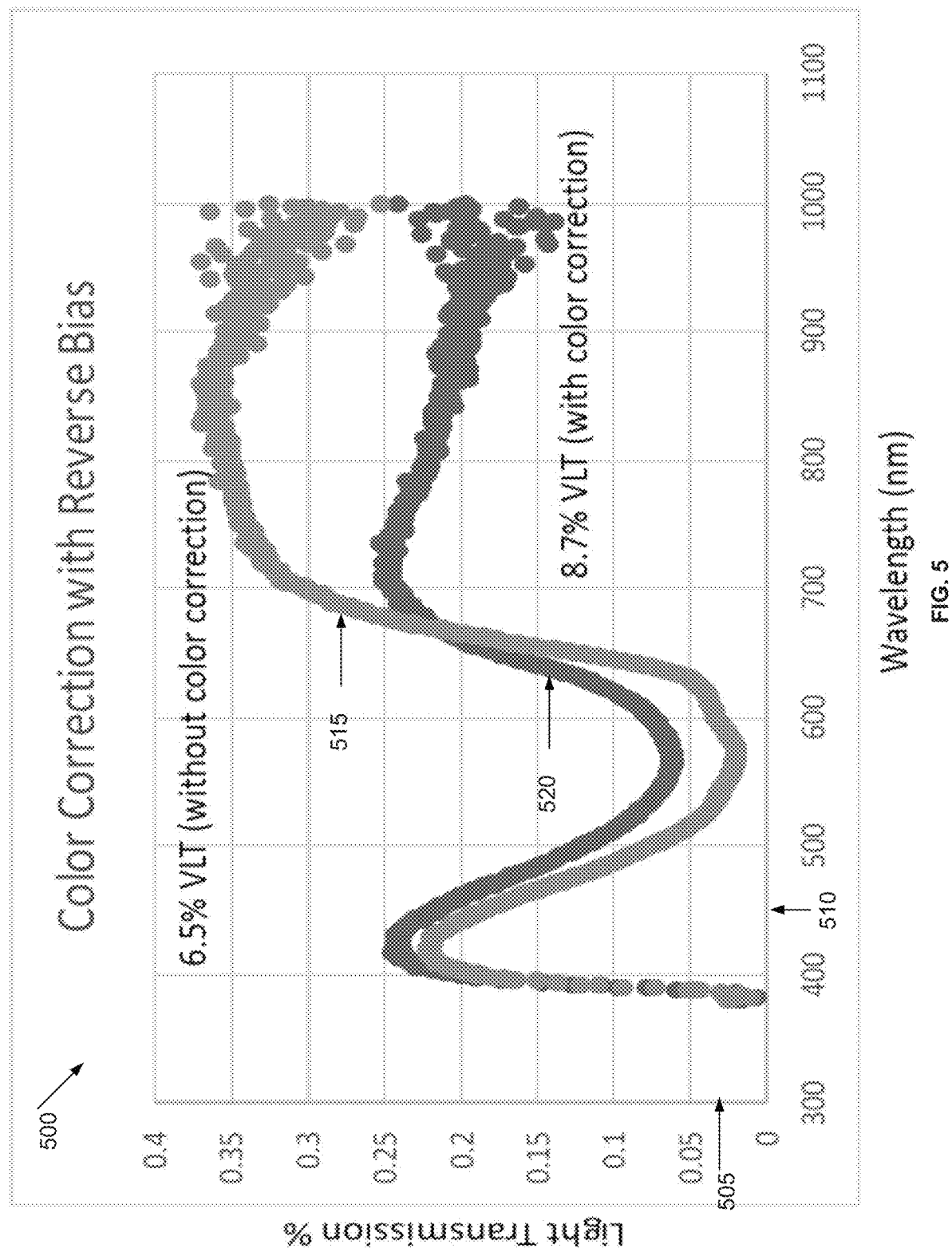
FIG. 5 is a graph of variation in a transmission state of an electrochromic device with and without color correction, in accordance with some embodiments of the present disclosure.

Referring to FIG. 5, an example graph 500 is shown, in accordance with some embodiments of the present disclosure. The graph 500 plots transmission on the Y-axis 505 against wavelength on the X-axis 510. The graph 500 shows a plot 515 in which the voltages are applied without a color correction operation and a plot 520 in which a color operation is performed. As seen from the graph 500, the plot 520 is able to maintain a lower transmission state compared to the plot 515. In some embodiments, without color correction (for a 4"×4" electrochromic device): −1.2V for 10 seconds may be used to achieve a low state transmission: 6.5%, a*=21.35, b*=−38.67, Near IR=34.12%. With color correction (for the same 4"×4" electrochromic device): +0.01V for 2 seconds may be used to achieve the low state transmission: 8.7%, a*=14.5, b*−28.02, Near IR=21.5%. The a* and b* are color coordinate values for the color space scale as defined by the International Commission on Illumination (CIE).

Thus, by applying a stepped voltage profile to the electrochromic device 100, the present disclosure provides an effective mechanism to perform a color correction operation and achieve the desired coloration in the electrochromic device. In some embodiments, the iris effect may also be reduced by applying the stepping voltage profile. In the iris effect, as the positive voltage is applied to increase coloration in the electrochromic device 100, the color starts changing from an edge inwards, with the last area to be colored being towards a center. The iris effect may be undesirable. The impact of the iris effect may be reduced or eliminated (or substantially eliminated) by altering or controlling the magnitude of the forward bias voltage that is applied.

Para. 1. A method of color correction in an electrochromic device, the method comprising: applying a stepped voltage profile to the electrochromic device in a high-transmission state to achieve a desired low-transmission state; applying, at the desired low-transmission state, a reverse bias voltage of about 0.01 volts to about 0.5 volts for about 0.01 seconds to about 10 seconds to color correct the low-transmission state; wherein: each step of the stepped voltage profile is at a step difference of about 0.01 volts to about 0.5 volts from an adjacent step, with each successive step being at a varying voltage level; and each step is held for a time period of about 0.1 seconds to about 10 seconds.

Para. 2. The method of Para. 1, wherein the reverse bias voltage is applied for a fraction of time compared to the stepped voltage profile.

Para. 3. The method of Paras. 1 or 2, wherein the stepped voltage profile and the reverse bias voltage are applied in alternating cycles.

Para. 4. The method of any one of Paras. 1-3, wherein the electrochromic device is held in an open circuit after application of the reverse bias voltage.

Para. 5. The method of any one of Paras. 1-4, wherein a forward bias voltage is applied to the electrochromic device after holding the electrochromic device in the open circuit to maintain the desired low-transmission state.

Para. 6. The method of any one of Paras. 1-5, wherein the forward bias voltage is applied after the desired low-transmission state reduces by about 5%.

Para. 7. The method of any one of Paras. 1-6, wherein: the reverse bias voltage is applied in a second stepped voltage profile; each successive step of the second stepped voltage profile is at a varying voltage level; and each step of the second stepped voltage profile is held for about 0.1 seconds to about 10 seconds.

Para. 8. The method of any one of Paras. 1-7, wherein the stepped voltage profile is applied at an elevated temperature that is above ambient temperature.

Para. 9. The method of any one of Paras. 1-8, wherein the elevated temperature is at least about 50° C.

Para. 10. The method of any one of Paras. 1-9, wherein the elevated temperature is about 50° C. to about 100° C.

Para. 11. A method for maintaining a low-transmission state of an electrochromic device, the method comprising: applying a stepped voltage profile to the electrochromic device in the low-transmission state to maintain the low-transmission state within 5% transmission, wherein each step is at a step difference of about 0.01 volts to about 0.5 volts from an adjacent step, with each successive step being at a varying voltage level, and each step being held for a time period of about 0.1 seconds to about 10 seconds; and at the low-transmission state, applying a reverse bias voltage of about 0.01 volts to about 0.5 volts for about 0.01 seconds to about 10 seconds to color correct the low-transmission state.

Para. 12. The method of Para. 11, further comprising holding the electrochromic device in an open circuit upon applying the reverse bias voltage and until the low-transmission state decreases by about 5%.

Para. 13. The method of Para. 11 or 12, further comprising: applying second stepped voltage profile to the electrochromic device in a high-transmission state to achieve the low-transmission state; wherein: each step of the second stepped voltage profile is at a step difference of about 0.01 volts to about 0.5 volts from an adjacent step with each successive step being at a varying voltage level and each step being held for about 0.1 seconds to about 10 seconds.

Para. 14. The method of Para. 13, wherein the second stepped voltage profile is applied at an elevated temperature that is above ambient temperature.

Para. 15. The method of Para. 14, wherein the elevated temperature is at least about 50° C.

Para. 16. The method of Para. 13 or 14, wherein the elevated temperature is about 50° C. to about 100° C.

Para. 17. An electrochromic device comprising: a first electrode; a second electrode; a cathodic material adjacent the first electrode and comprising a polythiophene-based compound; an anodic material adjacent the second electrode and comprising an ion storage layer; an electrolyte between the cathodic material and the anodic material; and a controller configured to: apply a negative voltage to induce reduction of the cathodic material and oxidation of the anodic material to obtain a low-transmission state of the electrochromic device; apply a positive voltage to perform color correction in the electrochromic device at the low-transmission state; and apply a second negative voltage to reduce transmission of the electrochromic device to a lower transmission state.

Para. 18. The electrochromic device of Para. 17, wherein a magnitude of the positive voltage is based upon a temperature of the electrochromic device.

Para. 19. The electrochromic device of Para. 18, wherein the magnitude of the positive voltage is lower when the temperature of the electrochromic device is at or above 50° C. compared to the magnitude of the positive voltage when the temperature of the electrochromic device is below 50° C.

Para. 20. The electrochromic device of any one of Paras. 17-19, wherein the positive voltage is applied at an elevated temperature that is above ambient temperature.

Para. 21. An electrochromic device comprising: a first electrode; a second electrode; a cathodic material adjacent the first electrode and comprising a polythiophene-based compound; an anodic material adjacent the second electrode and comprising an ion storage layer; an electrolyte between the cathodic material and the anodic material; and a controller configured to: apply a negative voltage to induce reduction of the cathodic material and oxidation of the anodic material to obtain a low-transmission state of the electrochromic device; apply a positive voltage to perform color correction in the electrochromic device at the low-transmission state; and apply a second negative voltage to reduce transmission of the electrochromic device to a lower transmission state.

Para. 22. The electrochromic device of Para. 21, wherein a magnitude of the positive voltage is based upon a temperature of the electrochromic device.

Para. 23. The electrochromic device of Para. 21 or 22, wherein the magnitude of the positive voltage is lower when the temperature of the electrochromic device is at or above 50° C. compared to the magnitude of the positive voltage when the temperature of the electrochromic device is below 50° C.

Para. 24. A non-transitory computer readable media comprising computer-readable instructions that when executed by a controller associated with an electrochromic device cause the controller to: apply a stepped voltage profile to the electrochromic device in a high-transmission state to achieve a desired low-transmission state; and apply, at the desired low-transmission state, a reverse bias voltage of about 0.01 volts to about 0.5 volts for about 0.01 seconds to about 10 seconds to color correct the low-transmission state; wherein: each step of the stepped voltage profile is at a step difference of about 0.01 volts to about 0.5 volts from an adjacent step with each successive step being at a varying voltage level; and each step is held for a time period for about 0.1 seconds to about 10 seconds.

It is to be understood that any examples used herein are simply for purposes of explanation and are not intended to be limiting in any way.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances, where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A method of color correction in an electrochromic device, the method comprising:
    applying a stepped voltage profile to the electrochromic device in a high-transmission state to achieve a desired low-transmission state;
    applying, at the desired low-transmission state, a reverse bias voltage of about 0.01 volts to about 0.5 volts for about 0.01 seconds to about 10 seconds to color correct the low-transmission state;
    wherein:
        each step of the stepped voltage profile is at a step difference of about 0.01 volts to about 0.5 volts from an adjacent step, with each successive step being at a varying voltage level; and
        each step is held for a time period of about 0.1 seconds to about 10 seconds.

2. The method of claim 1, wherein the reverse bias voltage is applied for a fraction of time compared to the stepped voltage profile.

3. The method of claim 1, wherein the stepped voltage profile and the reverse bias voltage are applied in alternating cycles.

4. The method of claim 1, wherein the electrochromic device is held in an open circuit after application of the reverse bias voltage.

5. The method of claim 4, wherein a forward bias voltage is applied to the electrochromic device after holding the electrochromic device in the open circuit to maintain the desired low-transmission state.

6. The method of claim 5, wherein the forward bias voltage is applied after the desired low-transmission state reduces by about 5%.

7. The method of claim 1, wherein:
    the reverse bias voltage is applied in a second stepped voltage profile;
    each successive step of the second stepped voltage profile is at a varying voltage level; and
    each step of the second stepped voltage profile is held for about 0.1 seconds to about 10 seconds.

8. The method of claim 1, wherein the stepped voltage profile is applied at an elevated temperature that is above ambient temperature.

9. The method of claim 8, wherein the elevated temperature is at least about 50° C.

10. The method of claim 8, wherein the elevated temperature is about 50° C. to about 100° C.

11. A method for maintaining a low-transmission state of an electrochromic device, the method comprising:
    applying a stepped voltage profile to the electrochromic device in the low-transmission state to maintain the low-transmission state within 5% transmission, wherein each step is at a step difference of about 0.01 volts to about 0.5 volts from an adjacent step, with each successive step being at a varying voltage level, and each step being held for a time period of about 0.1 seconds to about 10 seconds; and
    at the low-transmission state, applying a reverse bias voltage of about 0.01 volts to about 0.5 volts for about 0.01 seconds to about 10 seconds to color correct the low-transmission state.

12. The method of claim 11, further comprising holding the electrochromic device in an open circuit upon applying the reverse bias voltage and until the low-transmission state decreases by about 5%.

13. The method of claim 11, further comprising:
    applying second stepped voltage profile to the electrochromic device in a high-transmission state to achieve the low-transmission state;
    wherein:
    each step of the second stepped voltage profile is at a step difference of about 0.01 volts to about 0.5 volts from an adjacent step with each successive step being at a varying voltage level and each step being held for about 0.1 seconds to about 10 seconds.

14. The method of claim 13, wherein the second stepped voltage profile is applied at an elevated temperature that is above ambient temperature.

15. The method of claim 14, wherein the elevated temperature is at least about 50° C.

16. The method of claim 14, wherein the elevated temperature is about 50° C. to about 100° C.

17. An electrochromic device comprising:
    a first electrode;
    a second electrode;
    a cathodic material adjacent the first electrode and comprising a polythiophene-based compound;
    an anodic material adjacent the second electrode and comprising an ion storage layer;
    an electrolyte between the cathodic material and the anodic material; and
    a controller configured to:
        apply a negative voltage to induce reduction of the cathodic material and oxidation of the anodic material to obtain a low-transmission state of the electrochromic device;
        apply a positive voltage to perform color correction in the electrochromic device at the low-transmission state; and
        apply a second negative voltage to reduce transmission of the electrochromic device to a lower transmission state.

18. The electrochromic device of claim 17, wherein a magnitude of the positive voltage is based upon a temperature of the electrochromic device.

19. The electrochromic device of claim 18, wherein the magnitude of the positive voltage is lower when the temperature of the electrochromic device is at or above 50° C. compared to the magnitude of the positive voltage when the temperature of the electrochromic device is below 50° C.

20. The electrochromic device of claim 17, wherein the positive voltage is applied at an elevated temperature that is above ambient temperature.

* * * * *